US012750261B2

(12) United States Patent
Ferdinand et al.

(10) Patent No.: US 12,750,261 B2
(45) Date of Patent: Sep. 29, 2026

(54) METHODS AND APPARATUS FOR PULSE SHAPED AND OVERLAPPED PHASE TRACKING REFERENCE SIGNALS

(71) Applicant: Huawei Technologies Co., Ltd., Shenzhen (CN)

(72) Inventors: Nuwan Suresh Ferdinand, Kanata (CA); Huang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 18/963,072

(22) Filed: Nov. 27, 2024

(65) Prior Publication Data

US 2025/0141719 A1 May 1, 2025

Related U.S. Application Data

(63) Continuation of application No. PCT/CN2022/096943, filed on Jun. 2, 2022.

(51) Int. Cl.
*H04L 25/03* (2006.01)
*H04L 5/00* (2006.01)

(52) U.S. Cl.
CPC ...... *H04L 25/03834* (2013.01); *H04L 5/0048* (2013.01); *H04L 25/03006* (2013.01)

(58) Field of Classification Search
CPC ............. H04L 25/03834; H04L 5/0048; H04L 25/03006; H04L 27/26134; H04L 27/26536; H04L 27/2698; H04L 5/0044; H04L 27/2614; H04L 27/2613; H04L 27/264; H04L 25/03343; H04L 27/261; H04L 27/2646; H04L 2025/03783
See application file for complete search history.

(56) References Cited

U.S. PATENT DOCUMENTS 11,201,765 B2 12/2021 Kurras et al.
2020/0213050 A1* 7/2020 Chen ....................... H04L 5/005
(Continued)

FOREIGN PATENT DOCUMENTS

CN 110870242 A 3/2020
WO 9301672 A1 1/1993
(Continued)

OTHER PUBLICATIONS

Zhao Zhao et al.: "A simplified scattered pilot for FBMC/OQAM in highly frequency selective channels", 2014 11TH International Symposium On Wireless Communications Systems (Iswcs), IEEE, Aug. 26, 2014, pp. 819-823.
(Continued)

*Primary Examiner* — David S Huang
(74) *Attorney, Agent, or Firm* — Slater Matsil, LLP

(57) ABSTRACT

Methods and apparatus related to pulse-shaped and overlapped phase tracking reference signals are disclosed. Signaling that indicates information associated with first pulse shaping is communicated between a first communication device and a second communication device in a wireless communication network. Data with a phase tracking reference signal (PT-RS) is generated based on the first pulse shaping, and is transmitted and/or received as pulse-shaped PT-RS and data comprising the PT-RS and data to which second pulse shaping, different from the first pulse shaping, has been applied.

20 Claims, 14 Drawing Sheets

(56) References Cited

U.S. PATENT DOCUMENTS

| | | | |
|---|---|---|---|
| 2020/0304259 A1 | 9/2020 | Ihalainen et al. | |
| 2022/0021497 A1 | 1/2022 | Bai et al. | |
| 2022/0109538 A1 | 4/2022 | Ferdinand et al. | |
| 2024/0179040 A1* | 5/2024 | Cheng | H04L 27/2607 |

FOREIGN PATENT DOCUMENTS

| | | |
|---|---|---|
| WO | 9417596 A1 | 8/1994 |
| WO | 9828846 A1 | 7/1998 |
| WO | 2018041346 A1 | 3/2018 |

OTHER PUBLICATIONS

"3rd Generation Partnership Project; Technical Specification Group Radio Access Network; NR; Physical channels and modulation (Release 16)," 3GPP TS 38.211 V16.7.0, Sep. 2021, 134 pages.

"3rd Generation Partnership Project; Technical Specification Group Radio Access Network; NR; Physical layer procedures for data (Release 16)," 3GPP TS 38.214 V16.7.0, Sep. 2021, 172 pages.

* cited by examiner

METHODS AND APPARATUS FOR PULSE SHAPED AND OVERLAPPED PHASE TRACKING REFERENCE SIGNALS

CROSS-REFERENCE TO RELATED APPLICATION

This application is a continuation of International Application No. PCT/CN2022/096943, filed on Jun. 2, 2022, the disclosure of which is hereby incorporated by reference in its entirety.

TECHNICAL FIELD

The present application relates to wireless communications generally, and more specifically to phase tracking reference signals for use in wireless communications systems.

BACKGROUND

In some wireless communication systems, user equipments (UEs) wirelessly communicate with one or more network devices such as base stations, and potentially with each other. A wireless communication from a UE to a network device is also referred to as an uplink communication. A wireless communication from a network device to a UE is also referred to as a downlink communication. A direct wireless communication between UEs is referred to as a device-to-device communication or a sidelink communication. Network devices may also wirelessly communicate with each other over a backhaul link.

When wireless communication occurs between two communication devices, the communication device that is transmitting a signal may be referred to as a transmitting device, and the communication device that is receiving a signal may be referred to as a receiving device. A single communication device might be both a transmitting device and a receiving device, if that communication device performs both transmission and reception. Examples of communication devices include UEs and network devices. During uplink communication, for example, a UE is the transmitting device and a network device is the receiving device. During downlink communication, the UE is the receiving device and the network device is the transmitting device. One UE is the transmitting device and another UE is the receiving device during sidelink communication, and one network device is the transmitting device and another network device is the receiving device during backhaul communication between the network devices over a backhaul link.

A reference signal may be transmitted over a wireless channel from a transmitting device to a receiving device. The reference signal may be used, for example, in any of various receiving operations such as noise estimation. As wireless communication systems increasingly adopt higher carrier frequencies due to the availability of larger bandwidths at higher frequencies, the role of reference signals such as for noise estimation becomes even more crucial. Competing demands, such as peak to average power ratio (PAPR) and spectral efficiency, may create significant challenges for a correct reference signal operation in these wireless communication systems.

SUMMARY

The present disclosure relates to pulse shaping of reference signals such as a phase tracking reference signal (PT-RS), particularly for multiple UEs with overlapping bandwidth. At higher carrier frequencies, phase noise (PN) can become a significant issue. As a result, PT-RS was introduced in New Radio (NR), the so-called 5th Generation of wireless cellular communication. A receiver can use the PT-RS to estimate and correct PN, which can significantly improve block error rate (BLER) performance.

Pulse shaping may be used together with bandwidth expansion in signal waveforms to reduce a peak to average power ratio (PAPR) of a transmitted signal. Lower PAPR is generally desirable to reduce hardware complexity. For example, pulse shaping and bandwidth expansion may be used in a single carrier-offset quadrature amplitude modulation (SC-OQAM) waveform, or in a frequency domain spectral shaping with discrete Fourier transform-spread orthogonal frequency division multiplexing (FDSS-DFT-s-OFDM) waveform. Typically, pulse shaping is performed in the frequency domain, and a reduction of PAPR is achieved via bandwidth expansion and pulse shaping. This approach creates a tradeoff between PAPR and spectral efficiency. For example, larger bandwidth expansion, together with larger roll off factor of pulse shape, results in lower PAPR but reduces spectral efficiency.

This loss of spectral efficiency can be recovered by bandwidth overlapping UEs. A proper overlapping factor and pulse shaping guarantees orthogonality between UEs in flat fading channels. Although exact orthogonality is lost in a frequency selective channel, performance can still be improved significantly by multiplexing UEs with overlapped bandwidth.

Although a PT-RS with low PAPR is desirable, the implementation of PT-RS is non-trivial for SC-OQAM due to inter-symbol interference (ISI), particularly IQ interference. IQ interference refers to the imaginary interference to real symbols or real interference to imaginary symbols. Such IQ interference is a function of data and pulse shape. With IQ interference affecting a PT-RS symbol and being a function of data, a receiver has no knowledge of that interference, and thus the receiver cannot find the resultant PT-RS symbol to estimate PN.

The desire for spectral efficiency compounds this challenge. A conventional solution to the IQ interference issue involves a specific PT-RS design that cancels IQ interference or fixes it to a known value. This can be done by using auxiliary PT-RS symbols. Although this type of approach may work well for a single UE without bandwidth overlap with another UE, there can be significant problems when used with multiple UEs with bandwidth overlap, which is needed for spectral efficiency. A PT-RS designed to fix or cancel IQ interference of only one UE may not work in the presence of multiple UEs because of additional multi-UE interference to a PT-RS symbol at the receiver. This multi-UE interference can cause the receiver to estimate PN incorrectly.

Multi-UE interference issues are not limited to SC-OQAM, but may also affect other waveforms such as FDSS DFT-s-OFDM.

Embodiments of the present disclosure include a PT-RS approach that can reduce effects of interference such as IQ interference and multi-UE interference in overlap transmission, and enable a receiver to correctly estimate PN.

In some embodiments, IQ and multi-UE interference are handled differently. For example, multi-UE interference may be dealt with by using a different (shorter) pulse at a transmitter for a PT-RS signal. This is referenced herein as PT-RS pulse. PT-RS signals are designed to handle IQ interference based on the PT-RS pulse instead of a data pulse.

According to an aspect of the present disclosure, a method involves communicating, by a first communication device with a second communication device in a wireless communication network, signaling that indicates information associated with first pulse shaping. The method also involves transmitting, in the wireless communication network by the first communication device, data with a PT-RS generated based on the first pulse shaping, as pulse-shaped PT-RS and data comprising the PT-RS and data to which second pulse shaping has been applied.

In another aspect, a method involves communicating, by a second communication device with a first communication device in a wireless communication network, signaling that indicates information associated with first pulse shaping, and receiving, by the second communication device from the first communication device, data with a phase tracking reference signal (PT-RS) generated based on the first pulse shaping, as pulse-shaped PT-RS and data comprising the PT-RS and data to which second pulse shaping has been applied.

An apparatus according to another aspect of the present disclosure includes a processor and a non-transitory computer readable storage medium that is coupled to the processor. The non-transitory computer readable storage medium stores programming for execution by the processor. A computer program product may be or include such a non-transitory computer readable medium storing programming.

In an embodiment, the programming includes instructions to, or to cause the processor to, communicate, by a first communication device with a second communication device in a wireless communication network, signaling that indicates information associated with first pulse shaping. The programming also includes instructions to, or to cause the processor to, transmit, in the wireless communication network by the first communication device, data with a PT-RS generated based on the first pulse shaping, as pulse-shaped PT-RS and data comprising the PT-RS and data to which second pulse shaping has been applied.

In another embodiment, the programming includes instructions to, or to cause the processor to, communicate, by a second communication device with a first communication device in a wireless communication network, signaling that indicates information associated with first pulse shaping communicate; and to receive, by the second communication device from the first communication device, data with a PT-RS generated based on the first pulse shaping, as pulse-shaped PT-RS and data comprising the PT-RS and data to which second pulse shaping has been applied.

Optionally, in any of the above aspects or embodiments, the information associated with the first pulse shaping comprises one or more filter coefficients of a pulse shaping filter.

Optionally, in any of the above aspects or embodiments, the information associated with the first pulse shaping comprises a length of a pulse shaping filter.

Optionally, in any of the above aspects or embodiments, the information associated with the first pulse shaping specifies whether the first pulse shaping is to be applied in generation of the PT-RS.

Optionally, in any of the above aspects or embodiments, the PT-RS comprises one or more PT-RS symbols and one or more auxiliary PT-RS symbols.

Optionally, in any of the above aspects or embodiments, the PT-RS comprises a PT-RS symbol and two auxiliary PT-RS symbols adjacent to the PT-RS symbol, wherein the auxiliary PT-RS symbols are selected based on the first pulse shaping to control inter-symbol interference (ISI) to the PT-RS symbol.

Optionally, in any of the above aspects or embodiments, the PT-RS comprises a PT-RS symbol and an auxiliary PT-RS symbol adjacent to the PT-RS symbol, wherein the auxiliary PT-RS symbol is selected based on the first pulse shaping to control inter-symbol interference (ISI) to the PT-RS symbol.

Optionally, in any of the above aspects or embodiments, communicating signaling comprises transmitting the signaling from the first communication device to the second communication device.

Optionally, in any of the above aspects or embodiments, communicating signaling comprises receiving the signaling at the first communication device from the second communication device.

Optionally, in any of the above aspects or embodiments, transmitting the PT-RS and data comprises transmitting the PT-RS and data by the first communication device to the second communication device.

Optionally, in any of the above aspects or embodiments, transmitting the PT-RS and data comprises transmitting the PT-RS and data by the first communication device to a third communication device in the wireless communication network.

The present disclosure encompasses these and other aspects or embodiments.

BRIEF DESCRIPTION OF THE DRAWINGS

For a more complete understanding of the present embodiments, and the advantages thereof, reference is now made, by way of example, to the following descriptions taken in conjunction with the accompanying drawings.

DETAILED DESCRIPTION OF THE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Figure 1:
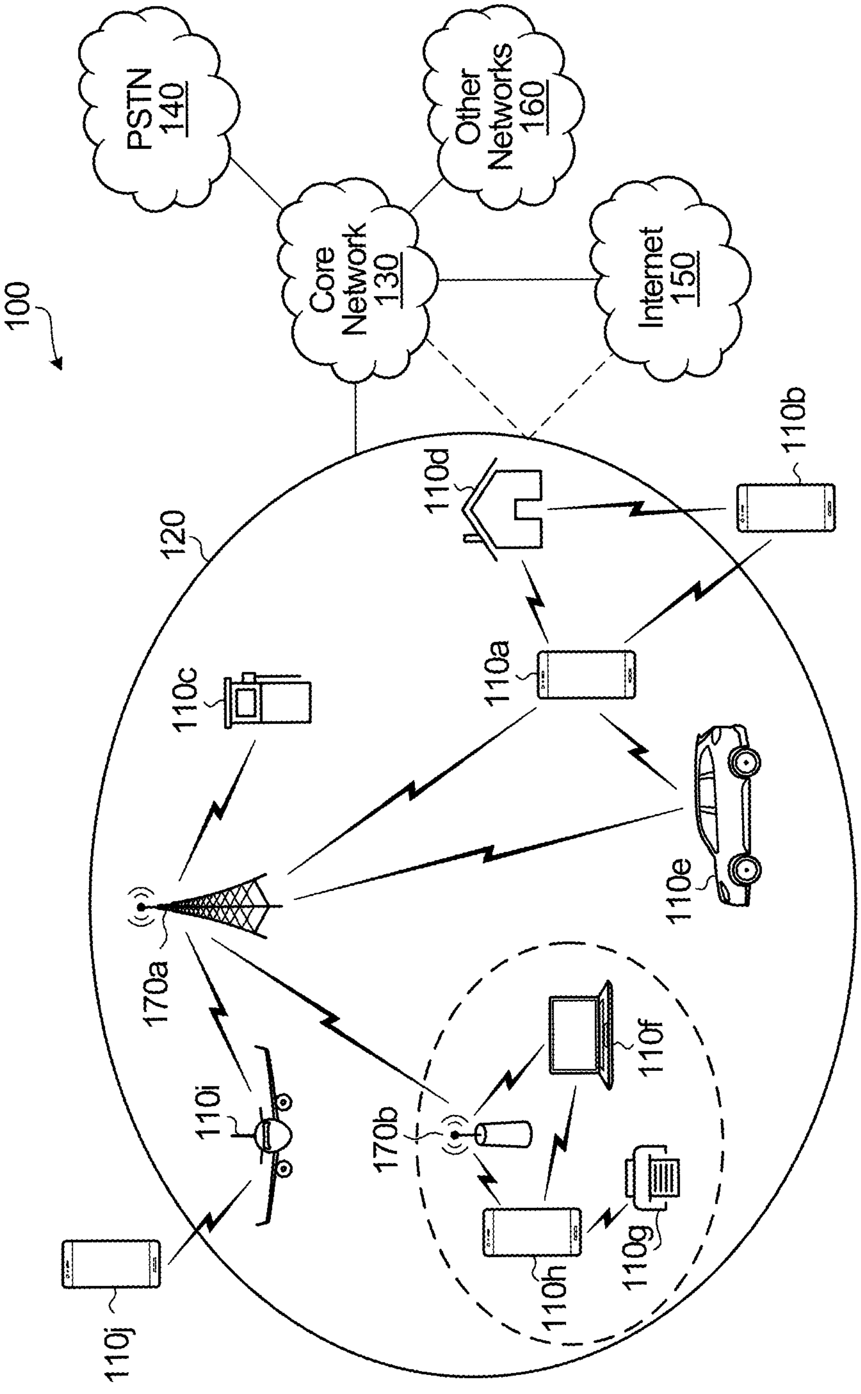
FIG. 1 is a simplified schematic illustration of a communication system.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
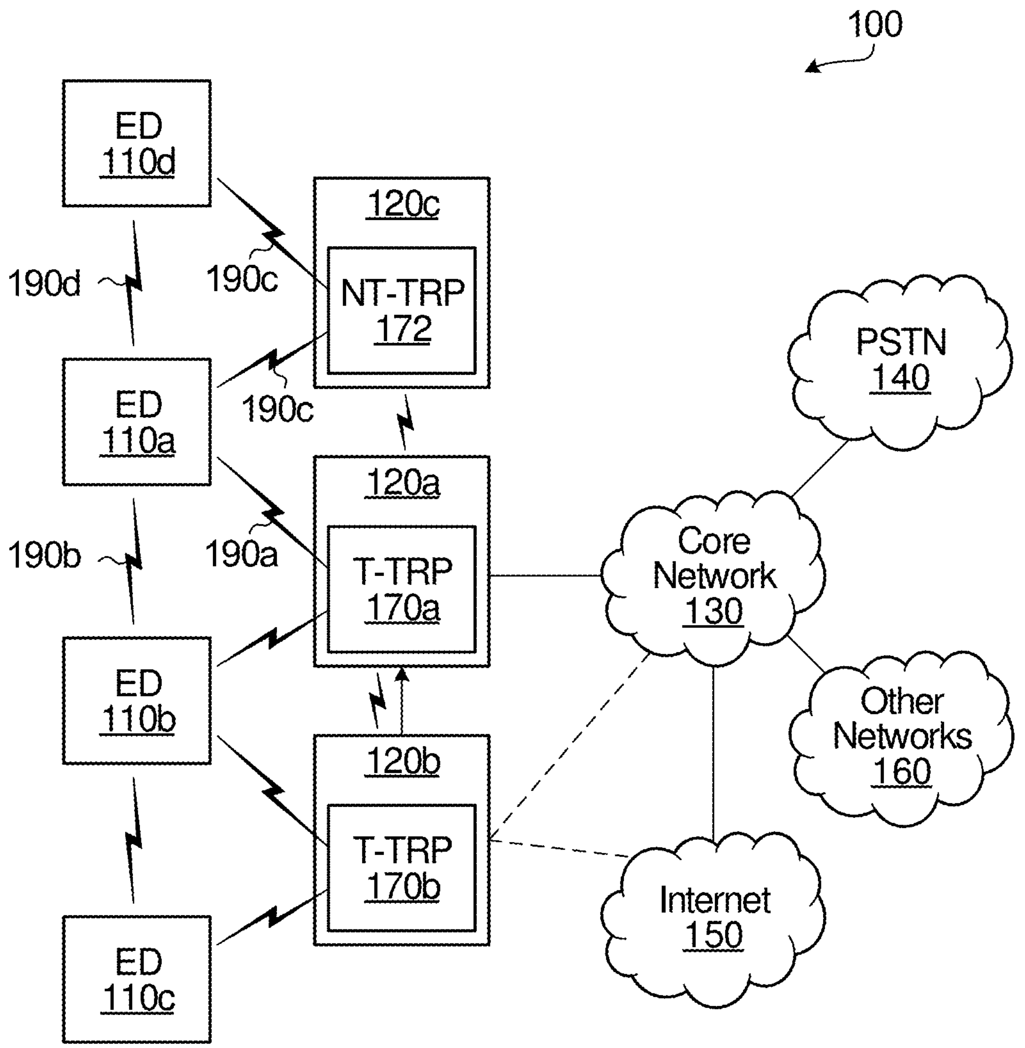
FIG. 2 is a block diagram illustration of the example communication system in FIG. 1.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over a non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), space division multiple access (SDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a*, 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

Figure 3:
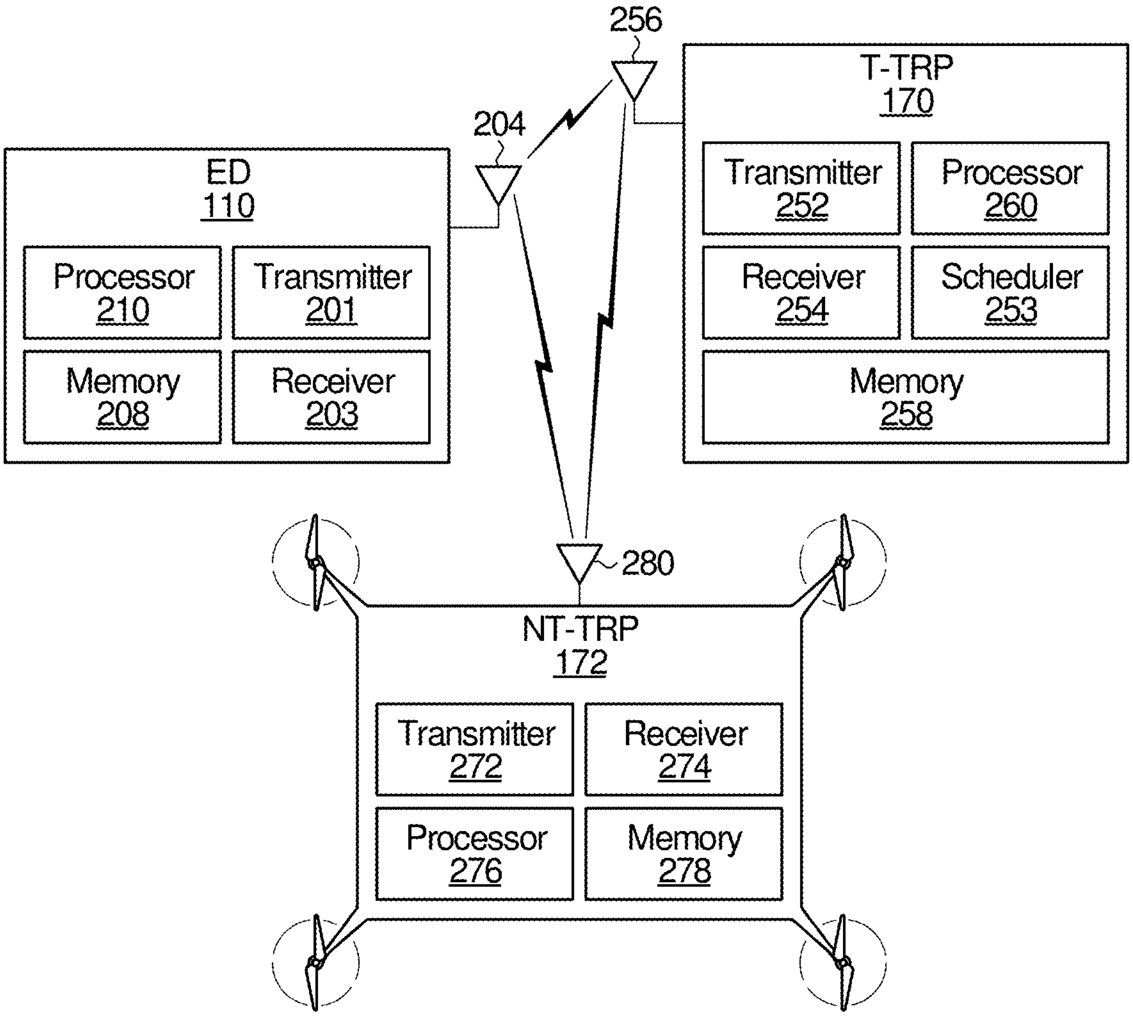
FIG. 3 illustrates an example electronic device and examples of base stations.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IoT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

The T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output (MIMO) precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
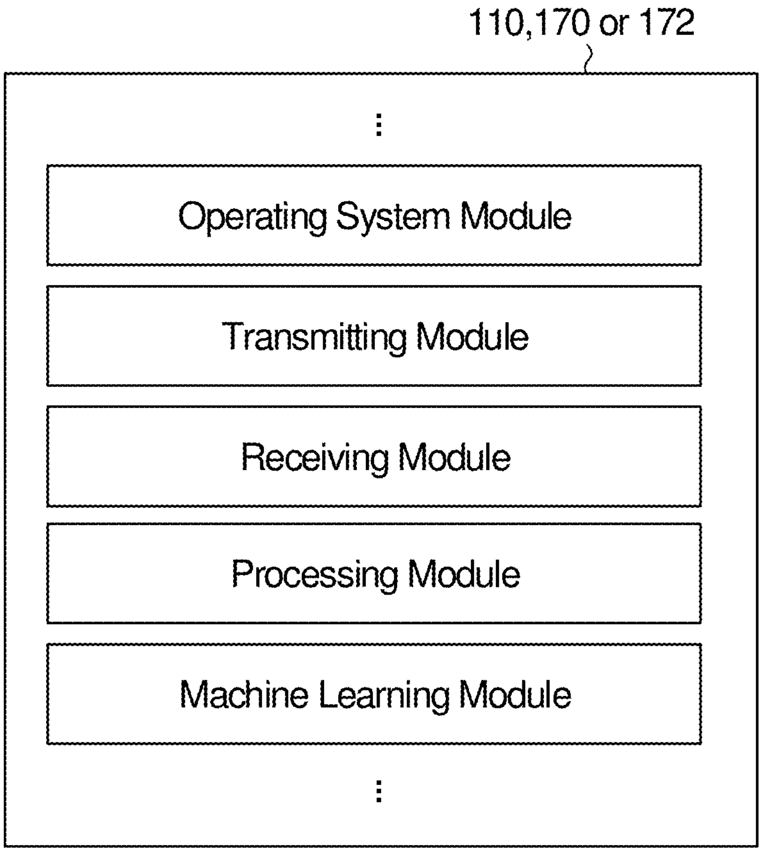
FIG. 4 illustrates units or modules in a device.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

Embodiments disclosed herein relate primarily to phase tracking reference signals for overlapped UEs or other multi-UE scenarios.

Figure 5:
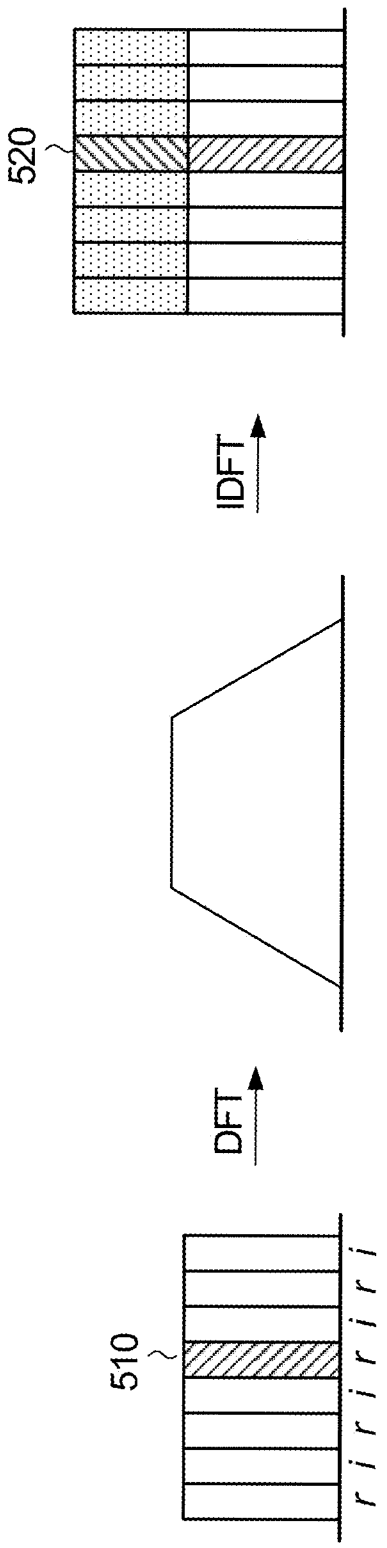
FIG. 5 illustrates IQ interference to a real PT-RS symbol.

Challenges with implementation of PT-RS due to ISI, and in particular IQ interference, are identified at least above. FIG. 5 illustrates IQ interference to a real PT-RS symbol. At the left, in FIG. 5, the "r" and "i" labels indicate symbols that are alternatively real and imaginary for SC-OQAM. The symbol 510 is a PT-RS symbol, and the others are data symbols. Once these symbols are pulse-shaped, the resultant symbols are shown at the right, in which the upper columns represent IQ interference. IQ interference to the PT-RS symbol is labelled 520, and the other upper columns represent IQ interference to data symbols. The fact that the IQ interference 520 to the PT-RS symbol is a function of data means that a receiver has no knowledge of that IQ interference and cannot find the resultant PT-RS symbol to estimate PN.

Figure 6:
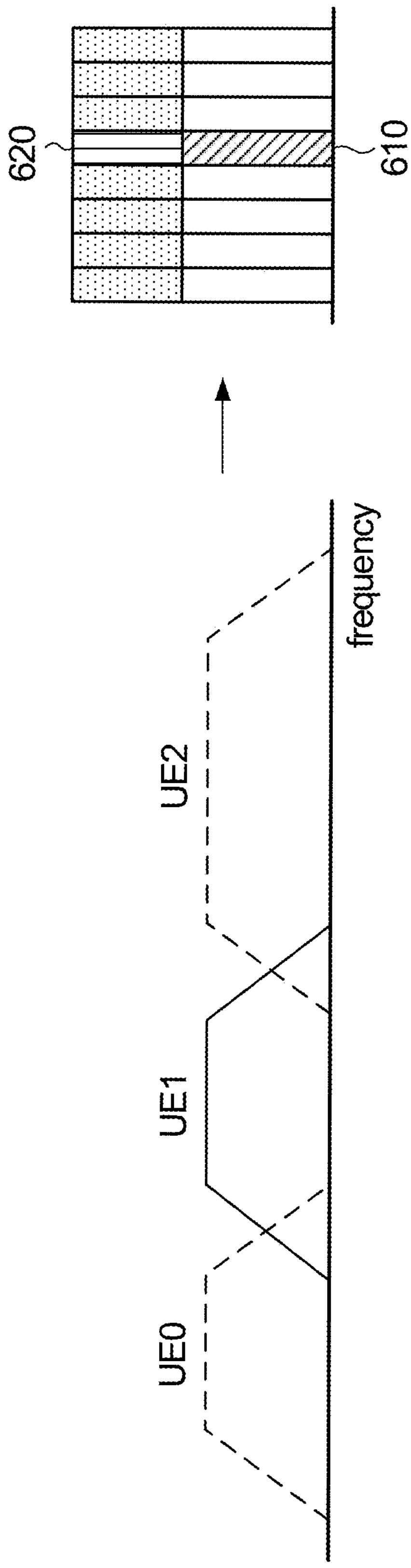
FIG. 6 illustrates multi-UE interference to a PT-RS symbol.

The IQ interference 520 may be reduced in a single-UE environment by using auxiliary PT-RS symbols, such as an auxiliary PT-RS symbol before or after the PT-RS symbol 510 to cancel the IQ interference 520. This type of approach may work well for a single UE environment, but consider the example in FIG. 6, which illustrates multi-UE interference to a PT-RS symbol. In this example, suppose that PT-RS is designed similar to the example shown in FIG. 5. However, in the presence of multiple UEs, shown in FIG. 6 as UE0, UE1, UE2, with bandwidth overlap, there will be at least multi-UE interference caused at the receiver. This multi-UE interference to a PT-RS symbol 610 is shown at 620, and may cause the receiver to estimate PN incorrectly.

According to embodiments disclosed herein, pulses or pulse types with two different pulse shapes are used at a transmitter. These pulses include a first pulse for PT-RS generation or design, denoted by $F_{PTRS}$, and a second pulse for data and PT-RS transmission, denoted by F. Thus, a pulse or pulse shape that is defined, specified, or characterized by $F_{PTRS}$ is used for PT-RS generation or design, and that pulse or pulse shape is different from a pulse shape that is used for transmission of data and PT-RS symbols. $F_{PTRS}$ and its length L are used by both the transmitter and a receiver, and can be distributed using signaling between communication devices, from a network device such as a base station to a UE, for example.

In the present disclosure, terminology such as pulses, pulse shapes, pulse shaping, filters, and filtering may all be used to refer to the same type of frequency domain processing. For example, a pulse or pulse shape may be applied, or pulse shaping may be performed, by filtering. F is introduced at least above as a first pulse for data and PT-RS transmission, and $F_{PTRS}$ is introduced at least above as a second pulse for PT-RS generation or design, denoted by $F_{PTRS}$. F and $F_{PTRS}$ may also or instead be referred to as filters. Elements of F and $F_{PTRS}$ may be referred to as pulse shaping coefficients, filter coefficients, or filtering coefficients, for example.

Figure 7:
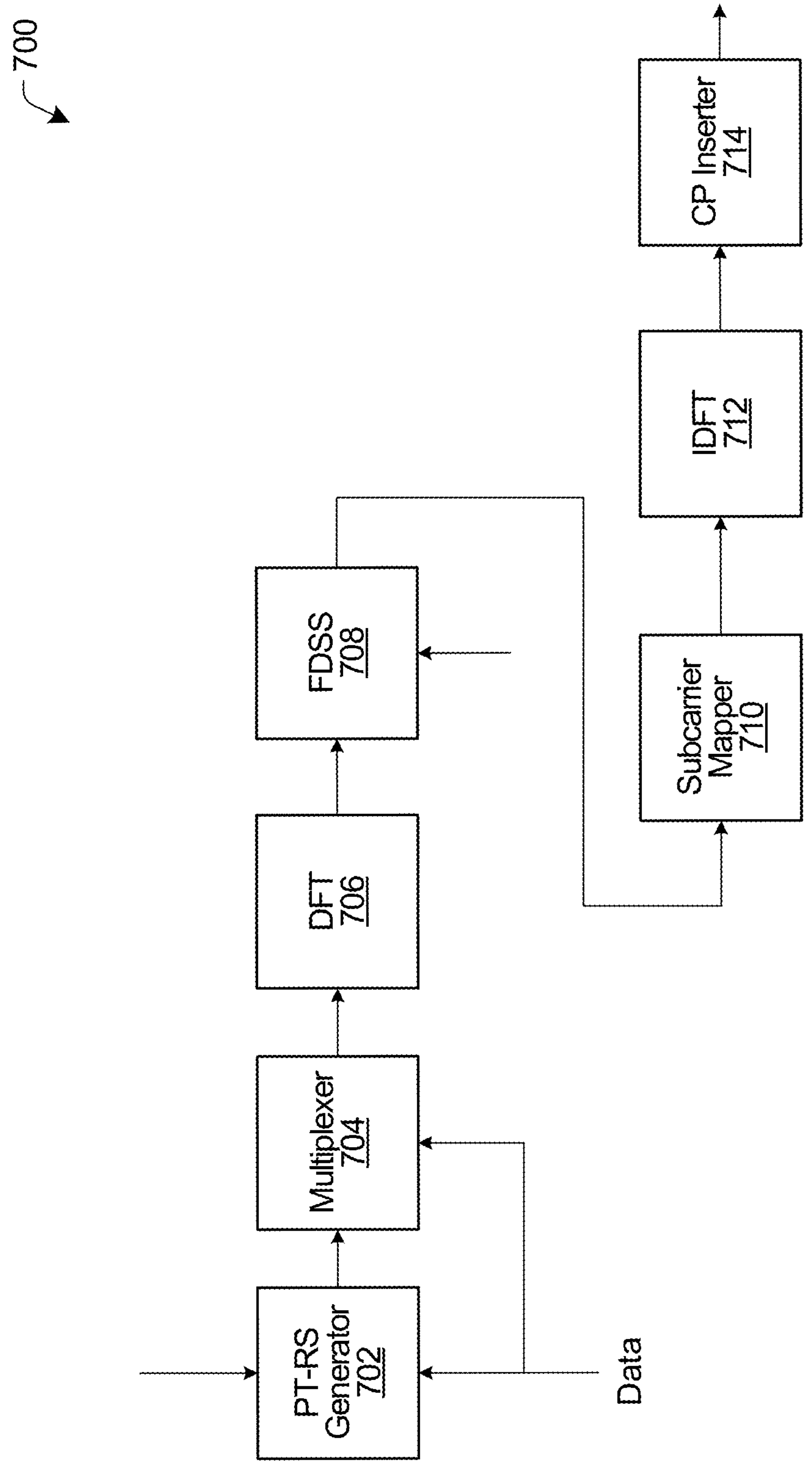
FIG. 7 is a block diagram illustrating an example transmitter.

FIG. 7 is a block diagram illustrating an example transmitter. The example transmitter generator 700 includes a PT-RS generator 702, multiplexer 704, a discrete Fourier transform (DFT) block 706, a pulse shaper 708 that applies frequency domain spectral shaping (FDSS) in the example shown, a subcarrier mapper 710, an inverse DFT (IDFT) block 712, and a cyclic prefix (CP) inserter 714, interconnected as shown. Other embodiments may include additional, fewer, or different elements interconnected in a similar or different way.

The elements shown in FIG. 7 may be implemented in any of various ways, such as in hardware, firmware, or one or more components that execute software. The present disclosure is not limited to any specific type of implementation, and implementation details may vary between different devices, for example. Each of the elements in the example shown is configured, by executing software for example, to implement various features or operations.

The PT-RS generator 702 is configured to use $F_{PTRS}$ to generate PT-RS symbols and auxiliary PT-RS symbols. Based on the $F_{PTRS}$ pulse, PT-RS generation may cancel IQ interference, fix it to a known value, or maximize it for facilitating interference estimation. The multiplexer is configured to multiplex PT-RS symbols and data symbols. The DFT block 706 is configured to convert the multiplexed symbols from time domain to frequency domain by performing a DFT operation, and the pulse shaper 708 is configured to pulse shape the frequency domain signal using pulse shaping filter F.

The subcarrier mapper 710 is configured to map the PT-RS and data to subcarriers. The IDFT block 712 is configured to create a time domain signal by converting the mapped symbols from frequency domain to time domain, in particular by performing an IDFT operation in the example transmitter 700. The CP inserter 714 is configured to insert a CP prior to baseband signal output, radio frequency (RF) up-conversion, and transmission.

Figure 8:
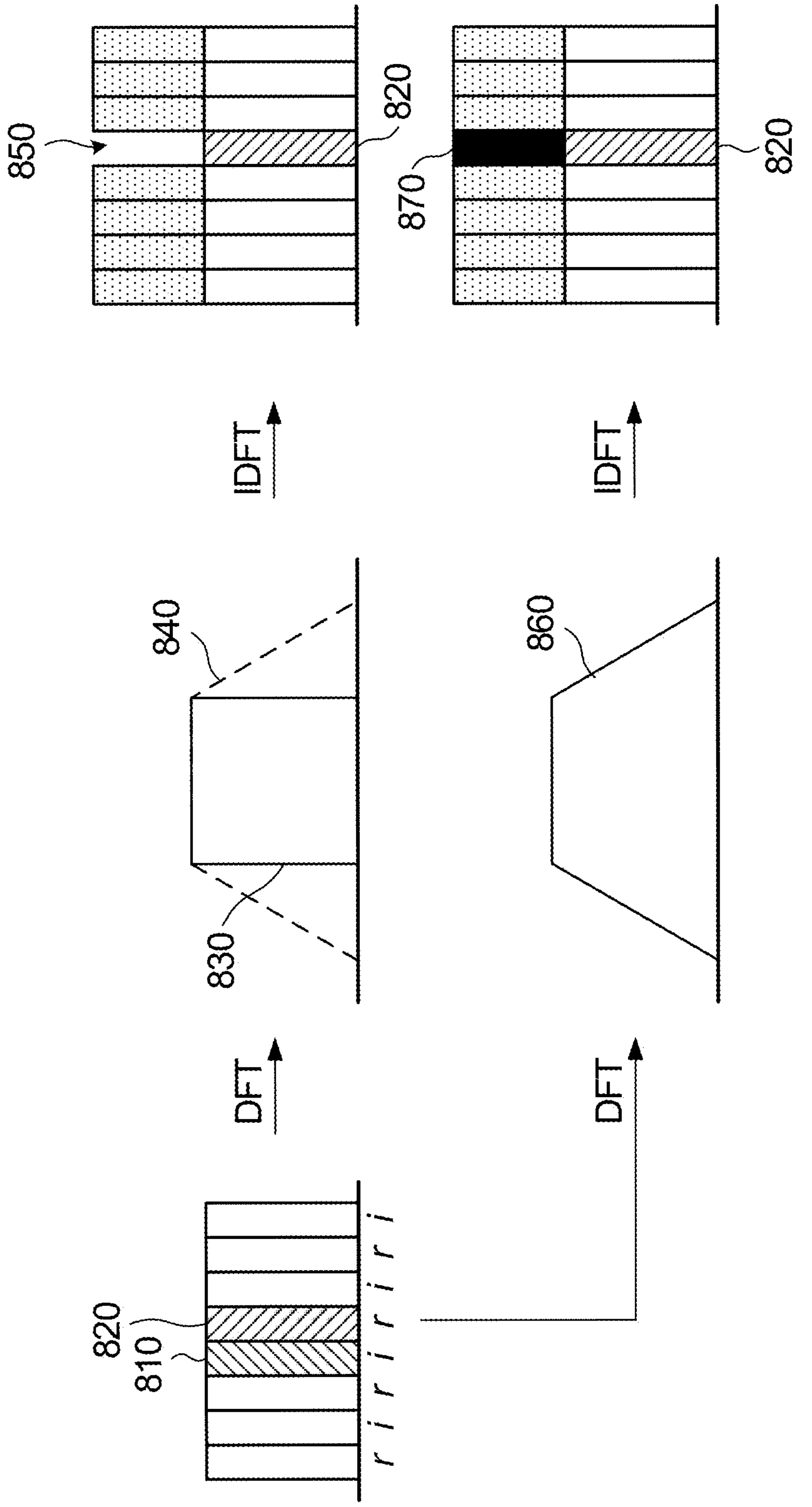
FIG. 8 illustrates two pulse shaping features according to an embodiment.

In the example transmitter 700, there are two primary pulse shaping features, including pulse shaping for PT-RS generation using the $F_{PTRS}$ pulse, and pulse shaping for data and PT-RS transmission using pulse shaping filter F. FIG. 8 illustrates these two pulse-shaping features.

In FIG. 8, 820 represents a PT-RS symbol, 810 represents an auxiliary PT-RS symbol, and the other symbols are data symbols. At the top of FIG. 8, 830 represents pulse shaping as applied (e.g., by 702) for PT-RS generation. This type of pulse shaping involves a pulse or pulse shape that is substantially a rectangular pulse in some embodiments, including the example shown. Pulse shaping (e.g., by 708) that is used for transmission of data and PT-RS symbols, described in greater detail below, is shown in dashed lines at 840 solely for comparison.

Pulse shaping for PT-RS, in embodiments of the present disclosure, involves a filter, $F_{PTRS}$, used at a transmitter to generate at least one of (i.e., either or both of) the PT-RS symbol 820 and the auxiliary PT-RS symbol 810, which will be a function of the data and the filter $F_{PTRS}$. The example at the top in FIG. 8 illustrates that if the transmitter uses the same pulse shaping (filter $F_{PTRS}$) to transmit the PT-RS and data, then there is no interference at 850. In practice, the transmitter will not use $F_{PTRS}$ to pulse-shape the multiplexed symbols, and instead uses a different pulse shaping represented in the lower part of FIG. 8 at 860, which involves a different filter F, which may have better PAPR performance than $F_{PTRS}$. Because the transmitter uses F to pulse-shape the multiplexed symbols and the PT-RS (either or both of 810, 820) is generated based on $F_{PTRS}$, interference as shown at 870 is created. However, this is not an issue at a receiver that uses $F_{PTRS}$ as a matched filter to separate the PT-RS symbol 820. Effects of interference 870 that would otherwise impact the PT-RS symbol 820 (if only transmission-pulse-shaping as shown at 860 were to be used, without $F_{PTRS}$-based PT-RS generation and matched filtering at a receiver) can thereby be reduced or avoided.

Figure 9:
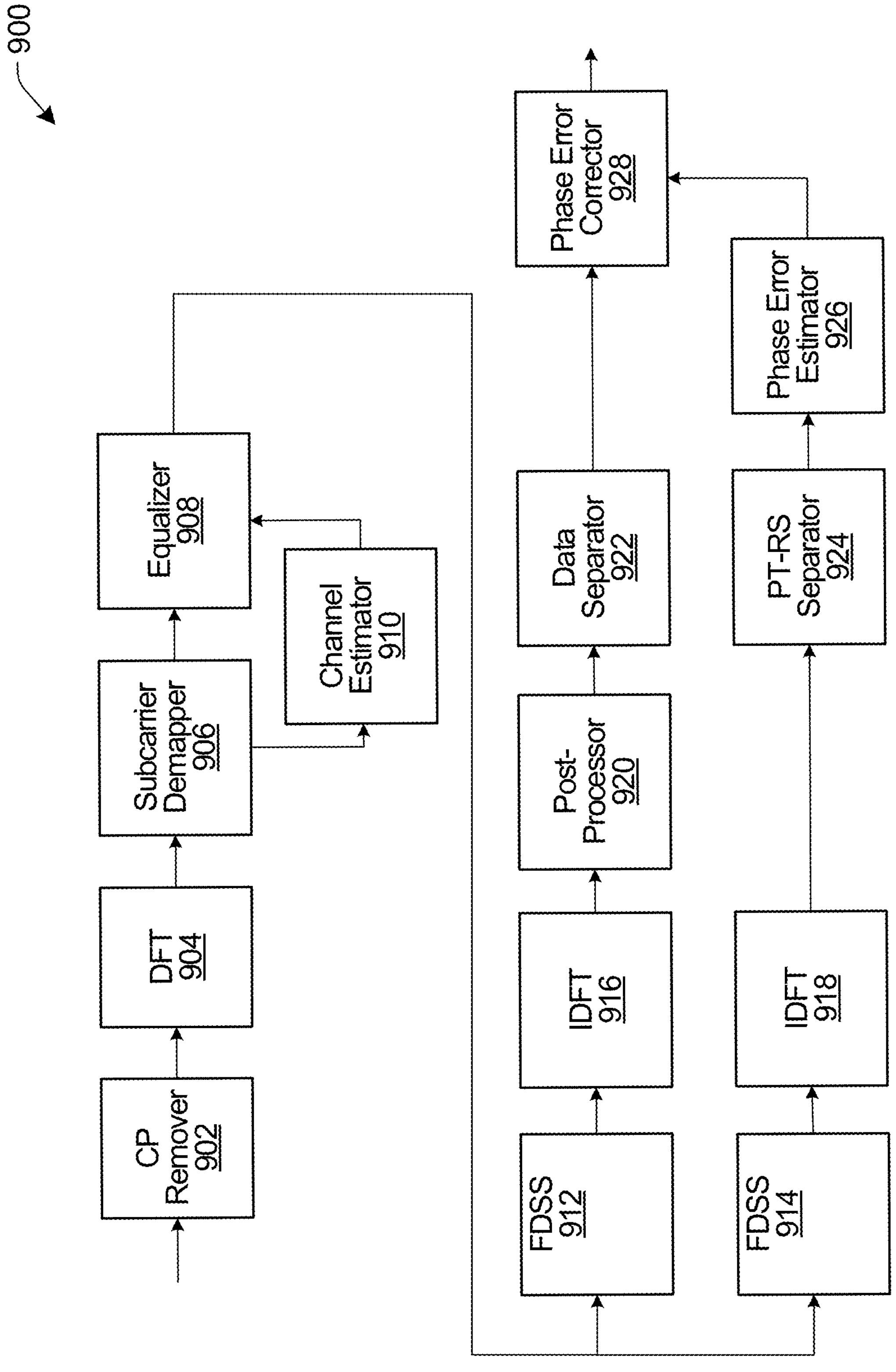
FIG. 9 is a block diagram illustrating an example receiver.

FIG. 9 is a block diagram illustrating an example receiver. The example receiver 900 includes a CP remover 902, a DFT block 904, a subcarrier demapper 906, an equalizer 908, a channel estimator 910, pulse shapers labelled as FDSS blocks 912, 914, IDFT blocks 916, 918, a post-processor 920, a data separator 922, a PT-RS separator 924, a phase error estimator 926, and a phase error corrector 928, interconnected as shown. Other embodiments may include additional, fewer, or different elements interconnected in a similar or different way.

The elements shown in FIG. 9 may be implemented in any of various ways, such as in hardware, firmware, or one or more components that execute software. As noted elsewhere herein, the present disclosure is not limited to any specific type of implementation, and implementation details may vary between different devices, for example.

Receiver operations may include CP removal, conversion to frequency domain by a DFT operation, subcarrier demapping and demultiplexing a data signal and a reference signal, channel estimation, equalization of the data signal based on channel estimates, and further processing related to phase error correction. Each of the elements in the example shown is configured, by executing software for example, to implement various features or operations.

In the example receiver 900, the CP remover 902 is configured to remove a cyclic prefix. The DFT block 904 is configured to perform a DFT operation to convert a received time domain signal to frequency domain. The subcarrier demapper 906 is configured to perform subcarrier demapping. The equalizer 908 is configured to equalize a data portion of the output of the subcarrier demapper 906. The channel estimator 912 is configured to process a reference signal portion of the output of the subcarrier demapper 906 to produce channel estimates that are provided to the equalizer 908.

In order to enable estimation of phase error due to phase noise, the pulse shaper 914 is configured to perform matched filtering based on the PT-RS pulse shape filter $F_{PTRS}$. The IDFT block 918 is configured to convert from frequency domain to time domain, and the PT-RS separator 924 is configured to separate PT-RS symbols from data symbols for estimation, by the phase error estimator 926, of phase error caused by phase noise. The elements at 912, 916, 920, and 922 are configured to perform matched filtering based on data transmission pulse shaping, frequency domain to time domain conversion, post-processing based on processing that is performed at the transmitter, and data separation, respectively. The phase error corrector 928 is configured to correct phase error in data symbols based on the phase error estimated by the phase error estimator 926.

Figure 10:
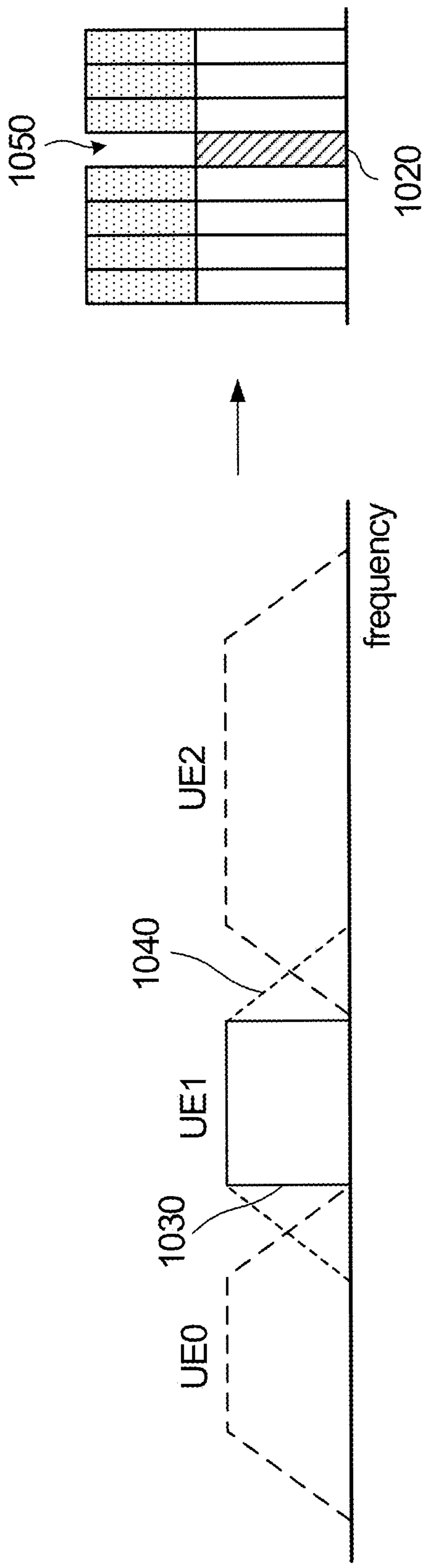
FIG. 10 illustrates receiver separation of a PT-RS symbol.

FIG. 10 illustrates receiver separation of a PT-RS symbol, as a visual representation of receiver PT-RS processing at 914, 918, and 924. A pulse shape 1030 is applied to PT-RS matched filtering, and that pulse shape is different from the data transmission pulse shape 1040, and as a result in the example shown IQ interference to a PT-RS symbol 1020 is canceled. 1050 in FIG. 10 denotes an absence of interference to the PT-RS symbol 1020. In other embodiments, the PT-RS generation fixes the IQ interference to a known value.

There are several ways to generate PT-RS symbols based on the pulse-shaping filter $F_{PTRS}$. Consider FIG. 11, which is a time domain plot illustrating data symbols, a real PT-RS symbol a, and two imaginary auxiliary PT-RS symbols adjacent to the PT-RS symbol, shown in FIG. 11 as $ib_1$, $ib_2$. This is an example only. In another embodiment, the PT-RS symbol is imaginary and the auxiliary PT-RS symbols are real. More generally, in some embodiments a PT-RS symbol has a real value and one or more auxiliary PT-RS symbols adjacent the PT-RS symbol have imaginary values, and in other embodiments a PT-RS symbol has an imaginary value and one or more auxiliary PT-RS symbols adjacent the PT-RS symbol have real values.

The objective of $ib_1$ and $ib_2$ is to "change", impact, or control inter-symbol interference (ISI) to the PT-RS symbol, for example to cancel ISI or to fix it to a known value. Rather than specifically discussing IQ interference, reference is made to the more general ISI here because the $F_{PTRS}$ pulse may not be a Nyquist pulse, and the resultant interference may be complex interference rather than purely real or imaginary interference.

In order to explain ISI cancelation, consider frequency domain pulse shaping and time domain filtering. An FDSS operation is typically accomplished in frequency domain, and an equivalent operation can be accomplished in time domain. More specifically, FDSS is known as a multiplication in frequency domain, and the equivalent time domain operation is circular convolution. In effect, what happens in time domain is filtering, which is why pulse shaping and filtering often refer to the same thing.

Let the equivalent time domain filter length be $T_1+T_{2+1}$ and its $n^{th}$ complex coefficient be $f_{Rn}+if_{In}$ where $n\in\{-T_1, -T_1+1, \ldots, -1, 0, 1, 2, \ldots, T_2\}$. The center coefficient of the filter is $f_{R0}+if_{I0}$.

Figure 11:
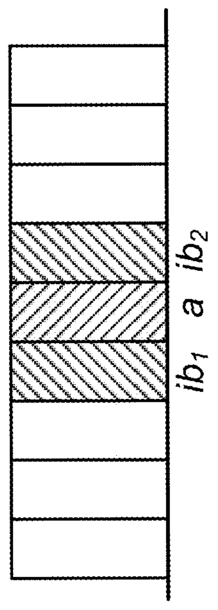
FIG. 11 is a time domain plot illustrating data symbols, a PT-RS symbol, and two auxiliary PT-RS symbols adjacent to the PT-RS symbol.

In FIG. 11, the PT-RS symbol is denoted by a and after filtering, this PT-RS symbol is affected by ISI. This ISI is a function of the filter, the auxiliary PT-RS symbols, and data, which is shown in FIG. 11 adjacent each of the auxiliary PT-RS symbols. Let the ISI from "data" be denoted by $I_R+iI_I$. The auxiliary PT-RS symbols are neighboring symbols, and the ISI generated from them are given by $(f_{R(-1)}+if_{I(-1)})ib_1$ and $(f_{R1}+if_{I1})ib_2$. Based on this, the PT-RS symbol plus the ISI term can be expressed as $$c=(f_{R0}+if_{I0})a+\left(f_{R(-1)}+if_{I(-1)}\right)ib_1+(f_{R1}+if_{I1})ib_2+I_R+iI_I$$

and the auxiliary PT-RS symbol values $b_1$ and $b_2$ can be selected to cancel the ISI such that $$\left(f_{R(-1)}+if_{I(-1)}\right)ib_1+(f_{R1}+if_{I1})ib_2+I_R+iI_I=0.$$

In this case, $b_1$ and $b_2$ are given by $$b_1=\frac{(f_{I1}I_I+f_{R1}I_R)}{f_{I(-1)}f_{R1}-f_{R(-1)}f_{I1}}$$

and $$b_2=\frac{(f_{I(-1)}I_I+f_{R(-1)}I_R)}{f_{R(-1)}f_{I1}-f_{I(-1)}f_{R1}}.$$

Alternatively, the auxiliary PT-RS symbols $b_1$ and $b_2$ are determined or otherwise obtained to fix the ISI to a predefined value $Q_R+iQ_I$. In this case, the value $Q_R+iQ_I$ is known to both the transmitter and the receiver. Therefore, the known ISI in this example is $$Q_R+iQ_I,$$

and a, $b_1$ and $b_2$ are chosen, determined, or otherwise obtained to satisfy $$(f_{R0}+if_{I0})a+\left(f_{R(-1)}+if_{I(-1)}\right)ib_1+(f_{R1}+if_{I1})ib_2+I_R+iI_I=Q_R+iQ_I.$$

Figure 12:
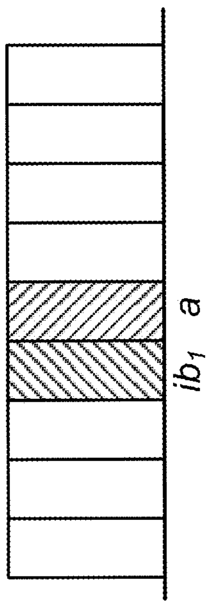
FIG. 12 is a time domain plot illustrating data symbols, a PT-RS symbol, and one auxiliary PT-RS symbol adjacent to the PT-RS symbol.

As another example, consider FIG. 12, which is a time domain plot illustrating data symbols, a PT-RS symbol of real value a, and an auxiliary PT-RS symbol adjacent to the PT-RS symbol, of imaginary value $ib_1$. Data symbols are also shown adjacent to the auxiliary PT-RS symbol and the PT-RS symbol.

In this example, with the same notation for filter coefficients and ISI as in the preceding example, the resultant PT-RS symbol after the receiver filter operation can be expressed as $$c=(f_{R0}+if_{I0})a+\left(f_{R(-1)}+if_{I(-1)}\right)ib_1+I_R+iI_I.$$

Suppose that only the real ISI is cancelled and the receiver is to estimate the imaginary ISI and use it for PN estimation. In this case, the PT-RS symbol and imaginary ISI are as follows, respectively:

$$c=(f_{R0}+if_{I0})a+i(f_{R(-1)}b_1+I_I)$$

-continued and $$b_1=\frac{I_R}{f_{I(-1)}}.$$

According to another embodiment, a and $b_1$ are selected to fix c to a specific, pre-defined value that is known to the receiver.

The examples above illustrate how auxiliary PT-RS symbols may be selected based on PT-RS pulse shaping, to control ISI to a PT-RS symbol.

These and other embodiments disclosed herein may provide approaches to generate PT-RS symbols based on non-Nyquist PT-RS design pulse shape.

Regarding implementation, signaling may be exchanged between communication devices to enable a transmitting device to generate and transmits PT-RS symbols and/or a receiving device to perform receiver processing to recover PT-RS symbols and accurately estimate phase error.

Signaling may be different, for example, for non-transparent and transparent receivers. In the case of a non-transparent receiver, the receiver has knowledge of pulse shaping used at the transmitter, from signaling that is transmitted to and received by the receiver for example. In the case of a transparent receiver, the receiver has no knowledge of pulse shaping used at the transmitter, and calculates, estimates, or otherwise determines the transmitter pulse shaping to estimate the both pulse and the channel.

Figure 13:
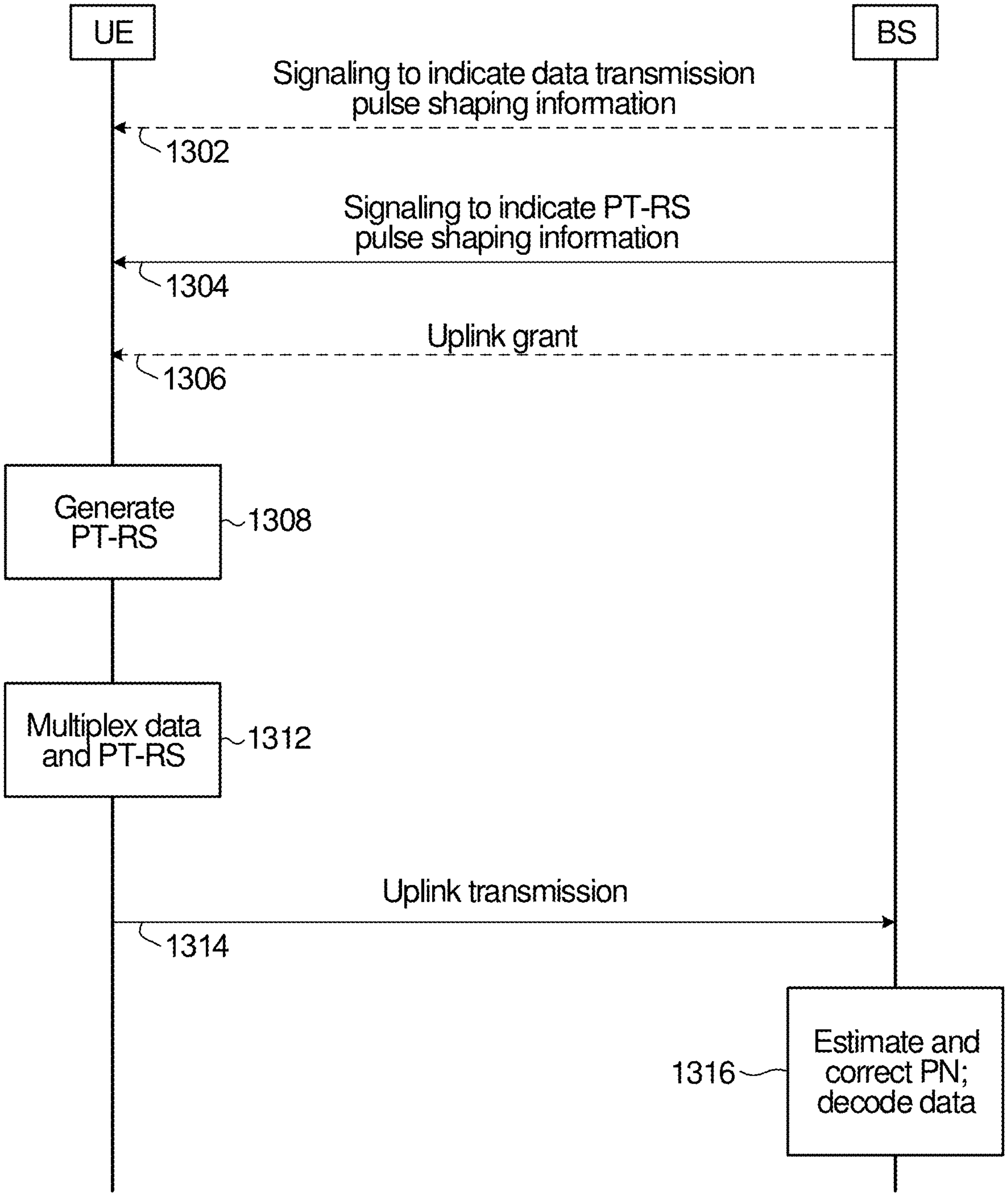
FIG. 13 is a signal flow diagram for uplink communications according to an embodiment.

FIG. 13 is a signal flow diagram for uplink communications according to an embodiment. Features illustrated in FIG. 13 include communicating signaling at 1304, which may be higher layer signaling for example, between a first communication device and a second communication device, in the form of a BS and a UE in the example shown. This communicating at 1304 involves transmitting the signaling by the BS to the UE and receiving the signaling by the UE from the BS. The signaling indicates information associated with first pulse shaping, which is referenced as PT-RS pulse shaping information in FIG. 13. This information associated with first pulse shaping may be or include, for example, one or more filter coefficients of a pulse shaping filter, a length of the pulse shaping filter, or both a length of a pulse shaping filter and one or more filter coefficients of a pulse shaping filter. A filter type may also or instead be specified in such information.

The information associated with the first pulse shaping may also or instead specify whether the first pulse shaping is to be applied in generation of the PT-RS. For example, in an embodiment multiple filters for pulse shaping are available at a communication device. Information associated with the filters may be transmitted by another communication device and received by the communication device, or the filters may be determined or otherwise obtained by the communication device, for example. Information that specifies whether a particular type of pulse shaping is to be applied in generation of a PT-RS may, for example, specify whether the communication device overlaps with one or more other communication devices. A communication device may then select one type of pulse shaping or filter based on the received signaling, to use one type of pulse shaping such as PT-RS pulse shaping as disclosed herein when the communication device overlaps with one or more other communication devices, and another type of pulse shaping such as the same pulse shaping that is used for transmission when the communication device does not overlap with any other communication device.

Thus, information associated with the first pulse shaping may be or include an indication to use an alternative pulse for PT-RS or indicate overlap of communication devices such as UEs, or more generally may be or include some form of information for a communication device to know that it is to use a different pulse for PT-RS if communication devices are overlapped or if multi-device interference is present.

Radio resource control (RRC) signaling is one example of higher layer signaling that may be used to indicate such information. Separate, optional signaling to indicate information associated with data transmission pulse shaping, also referred to herein as second pulse shaping, is illustrated at 1302. First and second pulse shaping, or PT-RS and data transmission pulse shaping as referenced in FIG. 13, are different. For example, as shown in FIGS. 8 and 10, PT-RS pulse shaping illustrated at 810, 1030 may have a different length, and be shorter, for example, than data transmission pulse shaping illustrated at 840, 1040. First and second pulse shaping may involve the same or similar filter types, such as raised cosine or root raised cosine, but are different at least in length, and may also involve different coefficients.

An uplink grant is optionally communicated between the BS and the UE at 1306, by the BS transmitting grant signaling to the UE and the UE receiving the grant signaling from the BS. Not all embodiments are necessarily grant-based, and therefore an uplink grant need not necessarily be communicated at 1306.

Generating a PT-RS by the UE is shown at 1308, and PT-RS generation is as disclosed elsewhere herein. At 1312, FIG. 13 illustrates multiplexing data and the generated PT-RS by the UE, and other transmit-side operations such as creating a symbol to be transmitted as in the example transmitter 700 (FIG. 7), may also be performed. An uplink transmission from the UE to the BS is shown at 1314, and represents one example of how a PT-RS may be communicated in a wireless communication network. In this example, communicating the PT-RS involves transmitting the PT-RS by the UE to the BS and receiving the PT-RS by the BS from the UE. The PT-RS may be transmitted, with data, as pulse-shaped PT-RS and data that includes the PT-RS (generated based on the PT-RS pulse shaping in FIG. 13) and data to which second pulse shaping (data transmission pulse shaping in FIG. 13) has been applied.

The PT-RS, as disclosed herein, is generated based on pulse shaping that is different from pulse shaping that is used for transmission of the PT-RS and data. The PT-RS may be or include one or more PT-RS symbols and one or more auxiliary PT-RS symbols. For example, in an embodiment, the PT-RS is or includes a PT-RS symbol and two auxiliary PT-RS symbols adjacent to the PT-RS symbol, and the auxiliary PT-RS symbols are selected based on the first pulse shaping to control ISI to the PT-RS symbol. In another embodiment, the PT-RS is or includes a PT-RS symbol and an auxiliary PT-RS symbol adjacent to the PT-RS symbol, and the auxiliary PT-RS symbol is selected based on the first pulse shaping to control ISI to the PT-RS symbol. Control of ISI may, for example, reduce or cancel the ISI or set the ISI to a known value. Illustrative examples of how values of one or both of the PT-RS symbol and the auxiliary PT-RS symbol(s) may be determined are provided at least above, with reference to FIGS. 11 and 12.

At 1316, FIG. 13 illustrates the BS estimating and correcting PN using the PT-RS, and decoding data.

Figure 14:
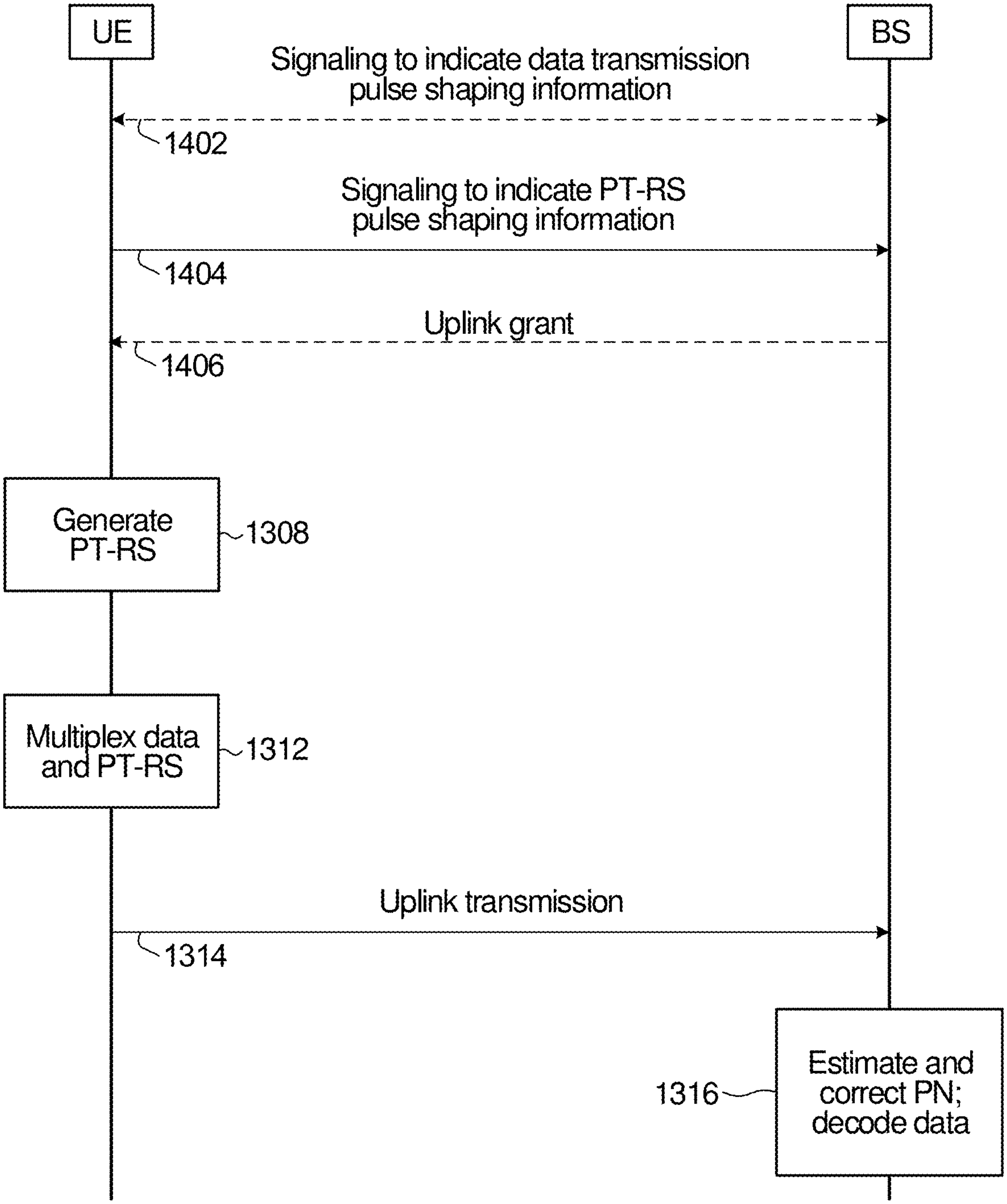
FIG. 14 is a signal flow diagram for uplink communications according to another embodiment.

FIG. 14 is a signal flow diagram for uplink communications according to another embodiment. The example in FIG. 14 is similar to the example in FIG. 12, but involves communicating signaling at 1404 by transmitting the signaling by the UE to the BS and receiving the signaling by the BS from the UE. In some embodiments, uplink communications may involve the UE selecting or otherwise obtaining PT-RS pulse shaping, and transmitting signaling that indicates information associated with the PT-RS pulse shaping, at 1404 and possibly 1402. The dual arrow directions at 1402 are intended to illustrate that signaling may be communicated in either direction or both directions, from the UE to the BS and/or from the BS to the UE, in some embodiments.

As an example of communicating signaling from the UE to the BS at 1404, consider an embodiment in which the UE obtains PT-RS pulse shaping that is to be applied in PT-RS generation. The UE may then transmit signaling at 1404 to indicate PT-RS pulse shaping length and/or one or more coefficients to the BS so that the BS can perform matched filtering based on the PT-RS pulse shaping.

Figure 15:
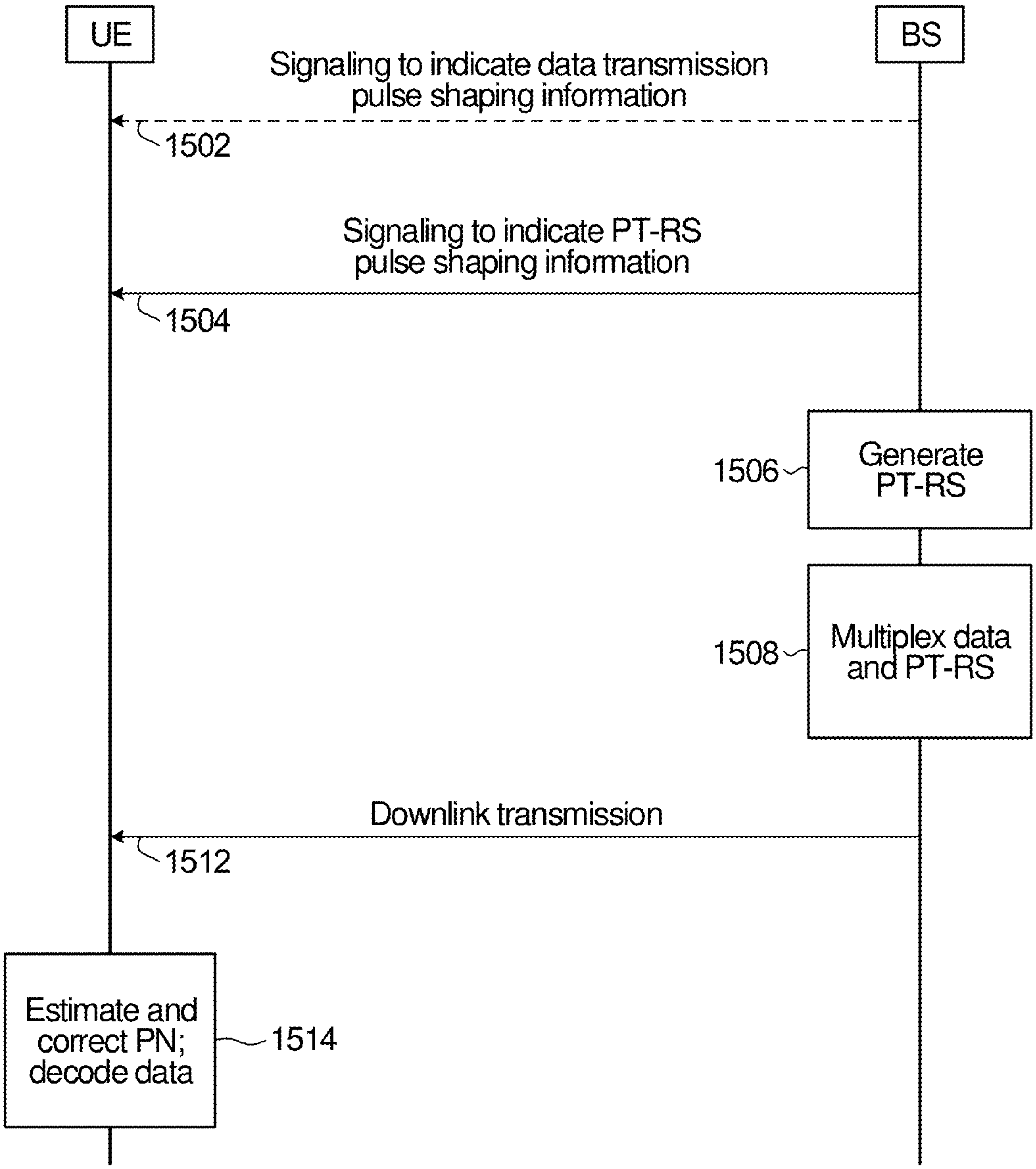
FIG. 15 is a signal flow diagram for downlink communications according to an embodiment.

FIG. 15 is a signal flow diagram for downlink communications according to an embodiment. Features illustrated in FIG. 15 include communicating signaling at 1504, and optionally at 1502, between a BS and a UE. As in FIG. 13, this communicating at 1502, 1504 involves transmitting the signaling by the BS to the UE and receiving the signaling by the UE from the BS. The signaling at 1504 indicates information associated with PT-RS pulse shaping, and the optional signaling at 1502 indicates information associated with data transmission pulse shaping.

PT-RS generation at the BS is shown at 1506. At 1508, FIG. 15 illustrates multiplexing data and the generated PT-RS by the BS, and other transmit-side operations such as creating a symbol to be transmitted as in the example transmitter 700 (FIG. 7), may also be performed. A downlink transmission from the BS to the UE is shown at 1512, and represents another example of how a PT-RS may be communicated in a wireless communication network. In this example, communicating the PT-RS involves transmitting the PT-RS by the BS to the UE and receiving the PT-RS by the UE from the BS. At 1514, FIG. 15 illustrates the UE performing PN estimation and correction using the PT-RS, and decoding data.

For downlink communications, it is likely that PT-RS parameters will be selected or otherwise determined by the BS. However, it is possible that PT-RS parameters previously transmitted by the UE to the BS and received by the BS from the UE may be used by the BS in generating a PT-RS for downlink communications. Therefore, communicating signaling that indicates information associated with PT-RS pulse shaping may involve communicating signaling from a UE to a BS, even in the case of downlink communications.

Figure 16:
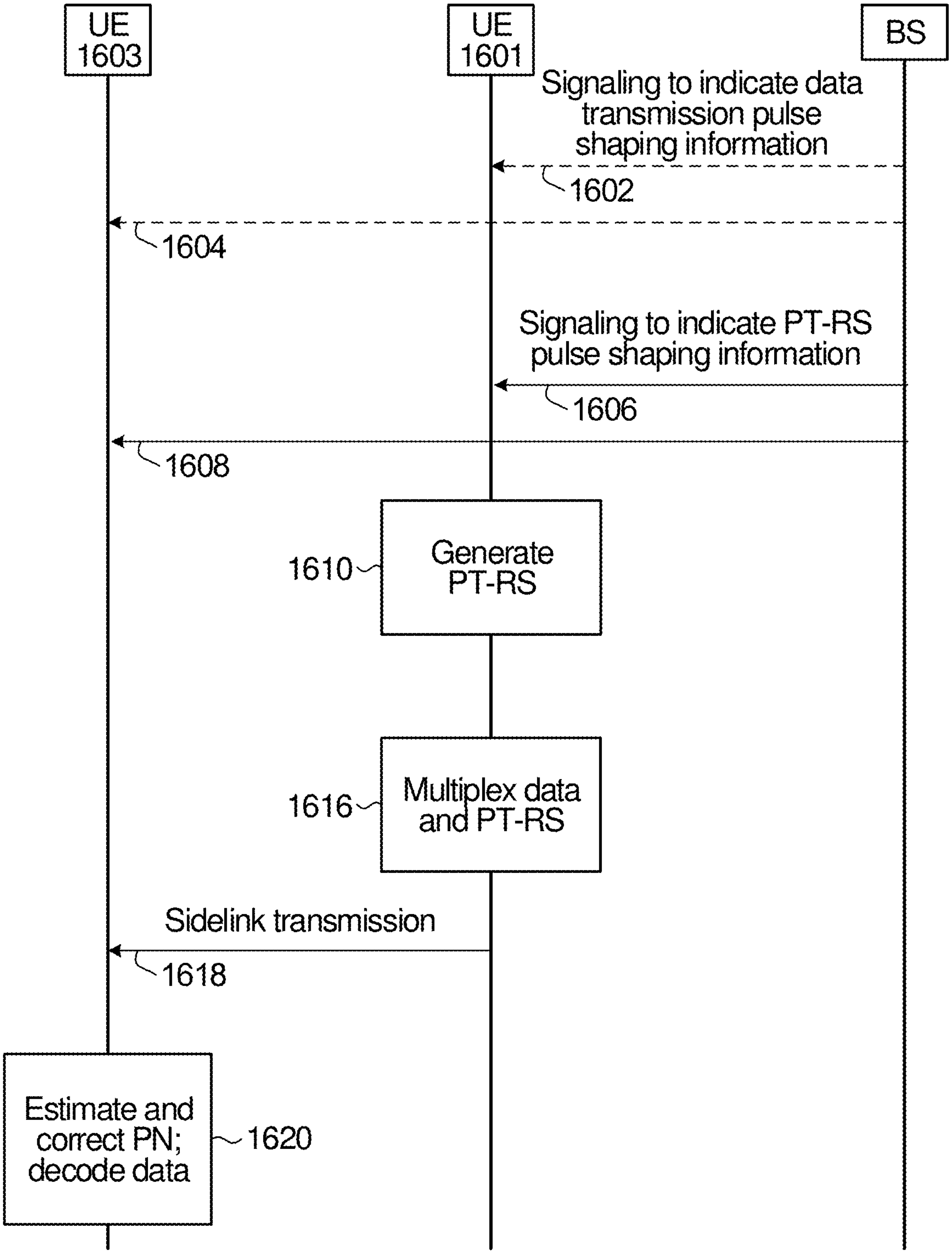
FIG. 16 is a signal flow diagram for sidelink communications according to an embodiment.

FIG. 16 is a signal flow diagram for sidelink communications according to an embodiment. Sidelink PT-RS transmission may occur between two UEs that may still be controlled by a BS. Features illustrated in FIG. 16 include communicating signaling at 1606, 1608, and optionally at 1602, 1604, between a BS and a first UE, UE 1601, and between the BS and a second UE, UE 1603. The communicating at 1602, 1606 involves transmitting the signaling by the BS to UE 1601 and receiving the signaling by UE 1601 from the BS. The communicating at 1604, 1608 involves transmitting the signaling by the BS to UE 1603 and receiving the signaling by UE 1603 from the BS. The signaling at 1606, 1608 indicates information associated with PT-RS pulse shaping. The signaling at 1602, 1604 may indicate information associated with data transmission pulse shaping.

Generating a PT-RS by UE 1601 is shown at 1610, and involve PT-RS generation as disclosed elsewhere herein. At 1616, FIG. 16 illustrates multiplexing data and the generated PT-RS by UE 1601, and other transmit-side operations such as creating a symbol to be transmitted as in the example transmitter 700 (FIG. 7), may also be performed. A sidelink transmission from UE 1601 to UE 1603 is shown at 1618, and represents one example of how a PT-RS may be communicated in a wireless communication network. In this example, communicating the PT-RS involves transmitting the PT-RS by UE 1601 to UE 1603 and receiving the PT-RS by UE 1603 from UE 1601. At 1620, FIG. 16 illustrates UE 1603 performing PN estimation and correction using the PT-RS, and decoding data.

Figure 17:
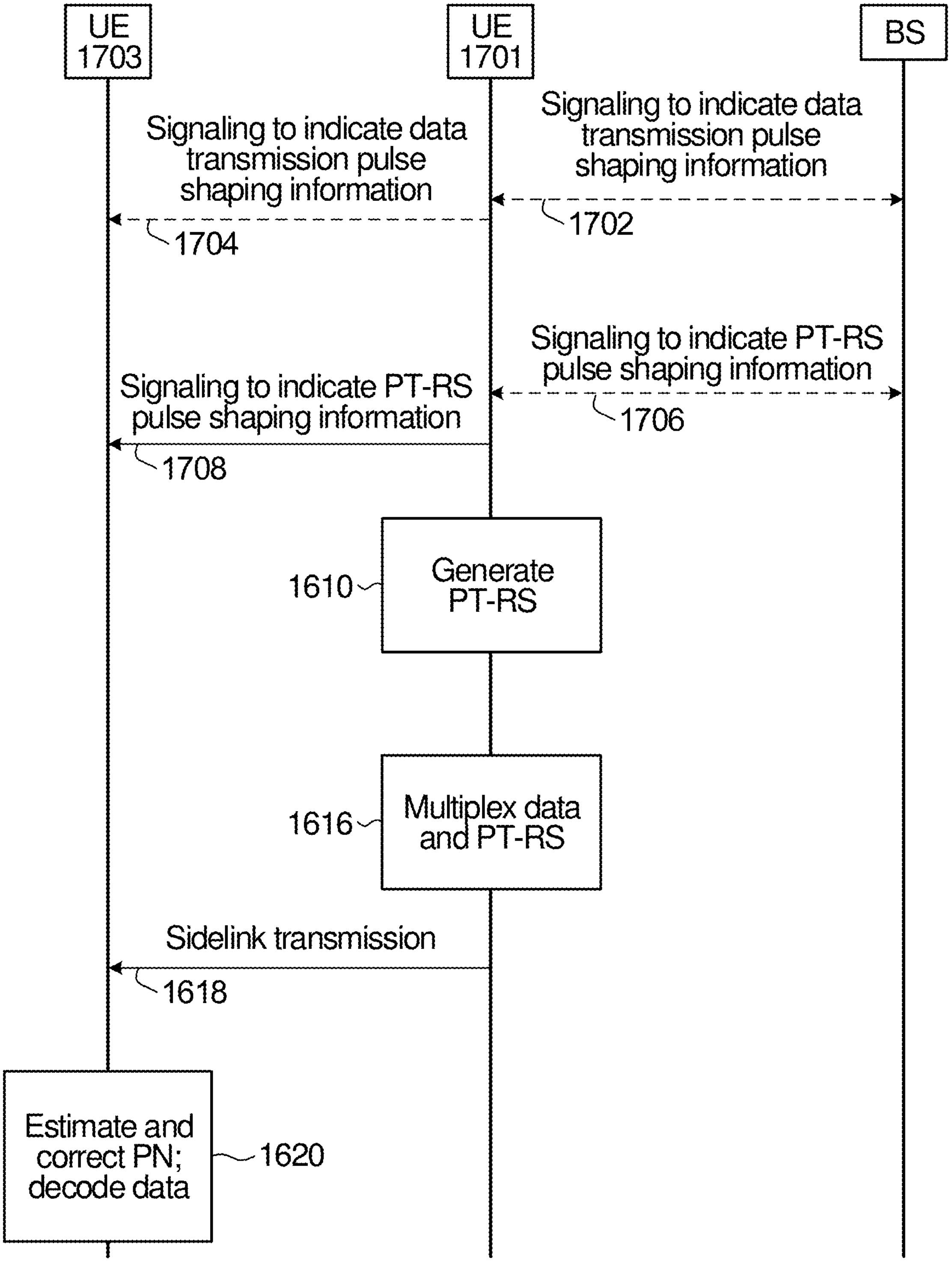
FIG. 17 is a signal flow diagram for sidelink communications according to another embodiment.

In another embodiment for sidelink communications, a transmitter UE such as UE 1601 configures one or more parameters for PT-RS transmission and sends the parameter(s) to a receiving UE such as UE 1603, via sidelink control information (SCI) or PC5 (sidelink RRC). FIG. 17 is a signal flow diagram for sidelink communications according to another embodiment, which involves communicating signaling between a UE 1701 and a UE 1703.

The example in FIG. 17 involves communicating signaling that indicates information associated with PT-RS pulse shaping (at 1708 and optionally at 1706), and possibly communicating signaling at 1702 and/or 1704 that is indicative of information associated with data transmission pulse shaping. At 1704, 1708, communicating signaling involves transmitting signaling by UE 1701 to UE 1703 and receiving the signaling by UE 1703 from UE 1701. Sidelink communications may involve a transmitting UE (UE 1701 in FIG. 17) selecting or otherwise obtaining PT-RS pulse shaping filter type and length for example, and transmitting signaling to a receiving UE (UE 1703 in FIG. 17).

Embodiments that involve communicating signaling between UEs as shown by way of example in FIG. 17 may or may not also involve communicating signaling between a BS and a UE. Optional features are shown in FIG. 17 at 1702, 1706. For sidelink communications, PT-RS-related operations may remain transparent to the BS, and the BS need not be informed of PT-RS parameters or communicate such parameters to UE 1701 at 1702, 1706.

FIGS. 13 to 17 are illustrative of various embodiments. More generally, a method consistent with the present disclosure may involve communicating signaling between a first communication device and a second communication device in a wireless communication network. From the perspective of one of these communication devices, for example, such a method performed by a first (or second) communication device involves communicating signaling with a second (or first) communication device. The signaling indicates information associated with first pulse shaping for PT-RS generation.

Communicating signaling may involve transmitting the signaling, receiving the signaling, or both. Similarly, communicating a PT-RS, with data for example, may involve transmitting the PT-RS (and data), receiving the PT-RS (and data), or both. For example, FIGS. 13 to 17 illustrate embodiments in which communicating signaling involves the following, any one or more of which may be provided or supported by different types of communication devices such as UEs or base stations:

- receiving, by a UE, signaling from a BS or another UE, as shown by way of example at 1302, 1304, 1402, 1502, 1504, 1602, 1604, 1606, 1608, 1702, 1704, 1706, 1708;
- receiving, by a BS, signaling from a UE, as shown by way of example at 1402, 1404, 1702, 1706;
- transmitting, by a UE, signaling to a BS and/or to another UE, as shown by way of example at 1402, 1404, 1702, 1704, 1706, 1708;
- transmitting, by a BS, signaling to one or more UEs, as shown by way of example at 1302, 1304, 1402, 1502, 1504, 1602, 1604, 1606, 1608, 1702, 1706.

These examples illustrate that communicating signaling may involve transmitting the signaling by any of various types of first communication device such as a UE or a base station or other network device, to any of various types of second communication device such as a UE or a base station or other network device. Communicating signaling may also or instead involve receiving the signaling at any of various types of first communication device such as a UE or a base station or other network device, from any of various types of second communication device such as a UE or a base station or other network device.

A method may also involve communicating, by a first communication device or a second communication device for example, a PT-RS in a wireless communication network. The PT-RS is generated based on first pulse shaping, but may be communication with data, for example, as pulse-shaped PT-RS and data that includes the PT-RS and data to which second pulse shaping, different from the first pulse shaping as disclosed herein, has been applied.

Similar to communicating signaling, communicating a PT-RS may involve transmitting the PT-RS, with data for example, by any of various types of communication device such as a UE or a base station or other network device, to any of various types of communication device such as a UE or a base station or other network device. Communicating a PT-RS may also or instead involve receiving the PT-RS at any of various types of communication device such as a UE or a base station or other network device, from any of various types of communication device such as a UE or a base station or other network device. Examples of communicating a PT-RS, including transmitting and receiving examples, are shown in FIGS. 13 to 17 at 1314, 1512, 1618.

A receiver or intended receiver (or receiving device) of a PT-RS may transmit or receive signaling before a PT-RS is received. In FIG. 13, for example, the BS is the intended receiver of the PT-RS and may transmit signaling at 1304, and optionally at 1302, before receiving the PT-RS at 1314. In FIG. 14, the BS is the intended receiver of the PT-RS and may receive signaling at 1404, and optionally transmit and/or receive signaling at 1402, before receiving the PT-RS at 1314. In FIG. 15, the UE is the intended receiver of the PT-RS and may receive signaling at 1504, and optionally at 1502, before receiving the PT-RS at 1512. In FIGS. 16 and 17, UE 1603 or UE 1703 is the intended receiver of a PT-RS and may receive signaling at 1608 and optionally at 1604 (from the BS) or at 1708 and optionally at 1704 (from UE 1701) before receiving a PT-RS at 1618.

Similarly, a transmitter or intended transmitter (or transmitting device) of a PT-RS may transmit or receive signaling before a PT-RS is transmitted. In FIG. 13, for example, the UE is the transmitter of the PT-RS and may receive signaling at 1304 and optionally at 1302 before transmitting the PT-RS at 1314. The UE is also the transmitter of the PT-RS in FIG. 14, but may transmit signaling at 1404 and optionally transmit and/or receive signaling at 1402 before transmitting the PT-RS at 1314. In FIG. 15, the BS is the transmitter of the PT-RS and may transmit signaling at 1504 and optionally at 1502 before transmitting the PT-RS at 1512. In FIGS. 16 and 17, UE 1601 or UE 1701 is the transmitter of a PT-RS and may receive signaling at 1606 and optionally 1602, 1702, 1706 (from the BS), or transmit signaling at 1708 and optionally at 1704 (to the UE 1703) and optionally at 1702, 1706 (to the BS) before transmitting a PT-RS at 1618.

In some embodiments, signaling and a PT-RS (possibly multiplexed or otherwise combined with data) are communicated between a transmitter and an intended receiver of the PT-RS, as in FIGS. 13 to 15 and between UE 1701 and UE 1703 in FIG. 17. Thus, in the context of communicating signaling between a first communication device and a second communication device, in such embodiments communicating a PT-RS involves communicating the PT-RS between the first communication device and the second communication device.

Signaling and a PT-RS need not necessarily be communicated between the same devices. Consider FIG. 16 as an example. Signaling is communicated between the BS and UE 1601 at 1606 and between the BS and UE 1603 at 1608, but the PT-RS is communicated between UE 1601 and UE 1603 at 1618. This is illustrative of embodiments in which signaling and a PT-RS are not communicated between the same devices. In the context of communicating signaling by a first communication device with a second communication device, in such embodiments communicating a PT-RS may involve communicating the PT-RS by the first communication device (or the second communication device) and a third communication device in the wireless communication network.

These are all illustrative of examples of communicating signaling and communicating a PT-RS.

These method examples are illustrative and non-limiting embodiments, and other embodiments may include additional or different features disclosed herein.

For example, FIGS. 13 to 17 and subsequent examples above are primarily in the context of one communication device, such as one UE, generating and transmitting a PT-RS. However, embodiments disclosed herein may be particularly useful in multi-UE environments or for other applications in which multiple communication devices generate and transmit PT-RSs, as shown by way of example in FIGS. 6 and 10. It should therefore be appreciated that features disclosed herein may be provided or supported by multiple communication devices. With reference to FIGS. 13 to 17, for example, multiple UEs and/or BSs may generate and transmit PT-RSs. A UE or BS may also or instead receive PT-RSs from multiple other communication devices. Signaling to indicate different pulse shaping may be transmitted by or received by multiple communication devices, such as multiple UEs, that are to transmit PT-RSs. Similarly, signaling to indicate different pulse shaping, for multiple communication devices that are to transmit PT-RSs, may be transmitted by or received by a communication device, such as a BS or other network device, that may receive PT-RSs from the multiple communication devices.

The present disclosure encompasses various embodiments, including not only method embodiments, but also other embodiments such as apparatus embodiments and embodiments related to non-transitory computer readable storage media. Embodiments may incorporate, individually or in combinations, the features disclosed herein.

An apparatus may include a processor and a non-transitory computer readable storage medium, coupled to the processor, storing programming for execution by the processor. In FIG. 3, for example, the processors 210, 260, 276 may each be or include one or more processors, and each memory 208, 258, 278 is an example of a non-transitory computer readable storage medium, in an ED 110 and a TRP 170, 172. A non-transitory computer readable storage medium need not necessarily be provided only in combination with a processor, and may be provided separately in a computer program product, for example.

As an illustrative example, programming stored in or on a non-transitory computer readable storage medium may include instructions to, or to cause a processor to, communicate signaling between a first communication device and a second communication device in a wireless communication network. The signaling may be communicated by the first (or second) communication device with the second (or first) communication device. The signaling indicates information associated with first pulse shaping.

The programming may include instructions to, or to cause the processor to, communicate signaling by any one or more of: transmitting the signaling from the first communication device to the second communication device, receiving the signaling at the first communication device from the second communication device, transmitting the signaling by the second communication device to the first communication device, and receiving the signaling by the second communication device from the first communication device.

The programming may include instructions to, or to cause the processor to, transmit, in the wireless communication network by the first communication device, data with a PT-RS generated based on the first pulse shaping, as pulse-shaped PT-RS and data comprising the PT-RS and data to which second pulse shaping has been applied. The programming may include instructions to, or to cause the processor to, transmit the PT-RS and data by transmitting the PT-RS and data by the first communication device to the second communication device, and/or by transmitting the PT-RS and data by the first communication device to a third communication device in the wireless communication network The programming may also or instead include instructions to, or to cause the processor to, receive, by the second communication device from the first communication device, data with a PT-RS generated based on the first pulse shaping, as pulse-shaped PT-RS and data comprising the PT-RS and data to which second pulse shaping has been applied.

Embodiments related to apparatus or non-transitory computer readable storage media for UE or network device operations may include any one or more of the following features, for example, which are also discussed elsewhere herein:

- the information associated with the first pulse shaping is or includes one or more filter coefficients of a pulse shaping filter;
- the information associated with the first pulse shaping is or includes a length of a pulse shaping filter;
- the information associated with the first pulse shaping is or includes one or more filter coefficients of a pulse shaping filter and a length of the pulse shaping filter;
- the information associated with the first pulse shaping specifies whether the first pulse shaping is to be applied in generation of the PT-RS;
- the PT-RS comprises one or more PT-RS symbols and one or more auxiliary PT-RS symbols;
- the PT-RS is or includes a PT-RS symbol and two auxiliary PT-RS symbols adjacent to the PT-RS symbol, and the auxiliary PT-RS symbols are selected based on the first pulse shaping to control ISI to the PT-RS symbol;
- the PT-RS comprises a PT-RS symbol and an auxiliary PT-RS symbol adjacent to the PT-RS symbol, wherein the auxiliary PT-RS symbol is selected based on the first pulse shaping to control inter-symbol interference (ISI) to the PT-RS symbol.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Features disclosed herein in the context of method embodiments, for example, may also or instead be implemented in apparatus or computer program product embodiments. In addition, although embodiments are described primarily in the context of methods and apparatus, other implementations are also contemplated, as instructions stored on one or more non-transitory computer-readable media, for example. Such media could store programming or instructions to perform any of various methods consistent with the present disclosure.

Illustrative embodiments disclosed herein relate primarily to PT-RSs. The same or similar embodiments may also or instead apply to other types of reference signals for channel estimation.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed:

1. A method comprising:

communicating, by a first communication device with a second communication device in a wireless communication network, signaling that indicates information associated with first pulse shaping; and transmitting, in the wireless communication network by the first communication device, data with a phase tracking reference signal (PT-RS) generated based on the first pulse shaping, as pulse-shaped data and PT-RS, the pulse-shaped data and PT-RS being generated based on second pulse shaping.

2. The method of claim 1, wherein the information associated with the first pulse shaping comprises at least one of: one or more filter coefficients of a pulse shaping filter, a length of the pulse shaping filter, or an indication whether the first pulse shaping is to be applied in generation of the PT-RS.

3. The method of claim 1, wherein the PT-RS comprises one or more PT-RS symbols and one or more auxiliary PT-RS symbols.

4. The method of claim 3, wherein the PT-RS comprises a PT-RS symbol and two auxiliary PT-RS symbols adjacent to the PT-RS symbol, and wherein the two auxiliary PT-RS symbols are selected based on the first pulse shaping to control inter-symbol interference (ISI) to the PT-RS symbol.

5. The method of claim 3, wherein the PT-RS comprises a PT-RS symbol and an auxiliary PT-RS symbol adjacent to the PT-RS symbol, and wherein the auxiliary PT-RS symbol is selected based on the first pulse shaping to control ISI to the PT-RS symbol.

6. A method comprising:

communicating, by a second communication device with a first communication device in a wireless communication network, signaling that indicates information associated with first pulse shaping; and receiving, by the second communication device from the first communication device, data with a phase tracking reference signal (PT-RS) generated based on the first pulse shaping, as pulse-shaped data and PT-RS, the pulse-shaped data and PT-RS being generated based on second pulse shaping.

7. The method of claim 6, wherein the information associated with the first pulse shaping comprises at least one of: one or more filter coefficients of a pulse shaping filter, a length of the pulse shaping filter, or an indication whether the first pulse shaping is to be applied in generation of the PT-RS.

8. The method of claim 6, wherein the PT-RS comprises one or more PT-RS symbols and one or more auxiliary PT-RS symbols.

9. The method of claim 8, wherein the PT-RS comprises a PT-RS symbol and two auxiliary PT-RS symbols adjacent to the PT-RS symbol, and wherein the two auxiliary PT-RS symbols are selected based on the first pulse shaping to control inter-symbol interference (ISI) to the PT-RS symbol.

10. The method of claim 8, wherein the PT-RS comprises a PT-RS symbol and an auxiliary PT-RS symbol adjacent to the PT-RS symbol, and wherein the auxiliary PT-RS symbol is selected based on the first pulse shaping to control ISI to the PT-RS symbol.

11. An apparatus comprising:

at least one processor; and a non-transitory computer readable storage medium, coupled to the at least one processor, storing programming for execution by the at least one processor, the programming including instructions to cause the apparatus to:

communicate, with a second communication device in a wireless communication network, signaling that indicates information associated with first pulse shaping; and transmit, in the wireless communication network, data with a phase tracking reference signal (PT-RS) generated based on the first pulse shaping, as pulse-shaped data and PT-RS, the pulse-shaped data and PT-RS being generated based on second pulse shaping.

12. The apparatus of claim 11, wherein the information associated with the first pulse shaping comprises at least one of: one or more filter coefficients of a pulse shaping filter, a length of the pulse shaping filter, or an indication whether the first pulse shaping is to be applied in generation of the PT-RS.

13. The apparatus of claim 11, wherein the PT-RS comprises one or more PT-RS symbols and one or more auxiliary PT-RS symbols.

14. The apparatus of claim 13, wherein the PT-RS comprises a PT-RS symbol and two auxiliary PT-RS symbols adjacent to the PT-RS symbol, and wherein the two auxiliary PT-RS symbols are selected based on the first pulse shaping to control inter-symbol interference (ISI) to the PT-RS symbol.

15. The apparatus of claim 13, wherein the PT-RS comprises a PT-RS symbol and an auxiliary PT-RS symbol adjacent to the PT-RS symbol, and wherein the auxiliary PT-RS symbol is selected based on the first pulse shaping to control ISI to the PT-RS symbol.

16. An apparatus comprising:

at least one processor; and a non-transitory computer readable storage medium, coupled to the at least one processor, storing programming for execution by the at least one processor, the programming including instructions to cause the apparatus to:

communicate, with a first communication device in a wireless communication network, signaling that indicates information associated with first pulse shaping; and receive, from the first communication device, data with a phase tracking reference signal (PT-RS) generated based on the first pulse shaping, as pulse-shaped data and PT-RS, the pulse-shaped data and PT-RS being generated based on second pulse shaping.

17. The apparatus of claim 16, wherein the information associated with the first pulse shaping comprises at least one of: one or more filter coefficients of a pulse shaping filter, a length of the pulse shaping filter, or an indication whether the first pulse shaping is to be applied in generation of the PT-RS.

18. The apparatus of claim 16, wherein the PT-RS comprises one or more PT-RS symbols and one or more auxiliary PT-RS symbols.

19. The apparatus of claim 18, wherein the PT-RS comprises a PT-RS symbol and two auxiliary PT-RS symbols adjacent to the PT-RS symbol, and wherein the two auxiliary PT-RS symbols are selected based on the first pulse shaping to control inter-symbol interference (ISI) to the PT-RS symbol.

20. The apparatus of claim 18, wherein the PT-RS comprises a PT-RS symbol and an auxiliary PT-RS symbol adjacent to the PT-RS symbol, and wherein the auxiliary PT-RS symbol is selected based on the first pulse shaping to control ISI to the PT-RS symbol.

* * * * *